(12) United States Patent
Jaskiewicz (10) Patent No.: US 6,877,011 B2
(45) Date of Patent: Apr. 5, 2005

(54) SYSTEM AND METHOD FOR HOST BASED STORAGE VIRTUALIZATION

(75) Inventor: Thomas Jaskiewicz, Mason, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 429 days.

(21) Appl. No.: 09/975,029

(22) Filed: Oct. 10, 2001

(65) Prior Publication Data

US 2003/0069886 A1 Apr. 10, 2003

(51) Int. Cl.[7] .............................................. G06F 17/30
(52) U.S. Cl. ...................................................... 707/102
(58) Field of Search ........................... 707/10, 102, 205, 707/101, 103, 100, 103 R; 711/114

(56) References Cited

U.S. PATENT DOCUMENTS

| | | | | |
|---|---|---|---|---|
| 5,365,606 A | * | 11/1994 | Brocker et al. ............. | 719/331 |
| 6,226,649 B1 | * | 5/2001 | Bodamer et al. ........ | 707/104.1 |
| 6,256,643 B1 | * | 7/2001 | Cork et al. ................. | 707/205 |
| 6,272,591 B2 | * | 8/2001 | Grun .......................... | 711/114 |
| 6,330,709 B1 | * | 12/2001 | Johnson et al. ............. | 717/100 |
| 6,385,643 B1 | * | 5/2002 | Jacobs et al. ................ | 709/203 |
| 6,493,816 B1 | * | 12/2002 | Munroe et al. ............. | 711/209 |
| 6,542,910 B2 | * | 4/2003 | Cork et al. ................. | 707/205 |
| 6,671,699 B1 | * | 12/2003 | Black et al. ................ | 707/201 |
| 6,754,679 B2 | * | 6/2004 | Oheda ........................ | 707/201 |

OTHER PUBLICATIONS

Dunning et al., The Virtual Interface Architecture, Micro Server Archit. Lab, Intel Corp. IEEE, Mar. 1988, vol. 18 issue 2, p. 66–76.*

* cited by examiner

*Primary Examiner*—Greta Robinson
(74) *Attorney, Agent, or Firm*—Lahive & Cockfield, LLP (57) ABSTRACT

The illustrative embodiment of the present invention provides a method of inserting a software created virtual interface between the user of a host electronic device and a network storage medium. Data read and write requests are written to the virtual interface. The virtual interface is located on the host electronic device and allocates data to available storage mediums. Recovery and reconfiguration operations on the storage mediums holding stored data are hidden from the user by the virtual interface and may be performed contemporaneously with the user accessing the stored data.

22 Claims, 6 Drawing Sheets

SYSTEM AND METHOD FOR HOST BASED STORAGE VIRTUALIZATION

FIELD OF THE INVENTION

The illustrative embodiment of the present invention relates generally to network storage and more particularly to a host based storage method utilizing a virtual interface between a host electronic device and network storage mediums.

BACKGROUND OF THE INVENTION

As the use of computers and computer networks has grown, so has the need for data storage. Duplicate copies of important data must be saved or "backed up" so that in the event of hardware or software failure the data is not lost. Additionally, large amounts of original data often must be saved in locations other than where the data is generated due to storage size considerations. Conventional methods of storing data have evolved from host based methods of storing data (i.e., copying data to multiple files and/or multiple disk drives on the same system) to network based storage solutions that store data at sites remote from the host.

A conventional network based storage system includes a volume controller and a multitude of storage mediums under the control of the volume controller. A volume is a storage medium partition which includes a table of contents listing all of the files stored in the partition. A storage medium may have more than one partition. A volume controller is a device used to send commands to the volumes in the storage system (i.e.: it enables access to the data in the volumes). The storage mediums are usually a collection of disk drives gathered in a single apparatus, such as a RAID system (RAID is an acronym for Redundant Array of Inexpensive/Independent Disks).

Most network storage systems are designed to attempt to provide continual access to data and continual protection of data. Unfortunately, the twin goals of protection and uninterrupted access sometimes conflict. In conventional network storage systems, the repair process to address hardware failure in the system interrupts access to data. Conventionally, a database or file system sends a collection of data over a network to a volume controller for storage. The volume controller sends the data to the storage mediums. This method of relying upon the volume controller to decide where to physically store data requires the proper functioning of the storage elements of the system.

If a device holding a storage medium fails, the volume controller attempts to recover from the failure by locating and activating a spare drive ("spindle"). During the process of substituting a spare spindle for the failed storage medium, access to data is interrupted during the activating of the spindle and the copying of data to the spindle. If there is not a spare spindle that is locatable by the volume controller, the data in the storage system may be unprotected and/or inaccessible depending upon the type of storage system being employed. Likewise, in network storage systems which leave the determination of the ultimate storage destination of data to an element in the network (i.e.: software on a switch or other device remote from the host electronic device) the data is similarly inaccessible during network storage system repairs. Similar delays in access to data accompany the re-configuration of the storage mediums used in the network storage system. Users, such as a file system or database, which are directly interfaced with the storage system are required in conventional network storage systems to wait for data access during the reconfiguration and repair of the storage system.

SUMMARY OF THE INVENTION

The illustrative embodiment of the present invention provides a method of inserting a virtual layer between the user of a host electronic device and a network storage medium. The virtual layer wraps a real volume of storage (i.e.: a logical unit) inside a virtual volume. The virtual logical unit (VLUN) is a software created virtual interface that encapsulates and hides some aspects of the real volume. One of the hidden attributes is the location of the real volume. The VLUN is implemented as a pseudo-device situated between the real volume and the user of the data in the volume. All accesses to the data in the real volume pass through the VLUN. By providing a virtual layer between the user and the network storage system, reconfiguration and repair of the storage system may be undertaken with minimal disruption of data access to the user.

The hiding of the real volume enables real-time data relocation. A user seeking access to the data through the VLUN is unaware of the actual location of the data. As long as the virtual interface (the VLUN) remains in an accessible location, the actual location of the data is irrelevant to the user. This allows the data to be moved around in the storage system as required. Such movement of data is often required during hardware failure and while performing preventive maintenance on the storage system (i.e.: swapping drives in RAID sets). The illustrative embodiments of the present invention provide duplicate copies of data which remain accessible through the VLUN even during the reconfiguration and repair of the RAID system and thus enable a user to access data at all times.

In one embodiment of the present invention, a host electronic device is interfaced with the network. A plurality of devices having storage mediums with device controllers, such as a RAID system, are also interfaced with the network. A software created VLUN is located on the host electronic device and acts as a virtual interface between a user of the host electronic device and the storage mediums. The users of the host electronic device, such as a file system, or database, send data write and read requests to the VLUN. The VLUN sends data write and read requests to a VLUN selected device controller for a device with a storage medium. The storage process beyond the VLUN is transparent to the user. The user has no direct interaction with the storage medium. In one implementation, the selected device is a RAID set, the device controller is a RAID volume controller, and the VLUN selects the RAID set based on a desired RAID level.

In another embodiment of the present invention, an apparatus interfaced with a network, includes a file system, processor and storage medium. The network is also interfaced with a plurality of storage devices which includes storage mediums. The apparatus further includes a software facility to create a virtual interface used to allocate data to available storage mediums. The storage mediums are transparent to the user of the apparatus and all read and write requests for storage are made through the virtual interface created by the software facility.

DETAILED DESCRIPTION

The illustrative embodiments of the present invention provide a method for performing host based storage virtualization. A software created virtual interface, known a virtual logical unit (VLUN), is inserted between a user, such as a file system or database, on a host electronic device, and the end storage mediums located, in most cases, remotely over a network. The insertion of the VLUN abstracts the process of storing data such that the end storage mediums locations are opaque to the user. The user writes data to the VLUN and reads data from the VLUN. The VLUN is located on the host electronic device interfaced with the network. The location of the VLUN on the host electronic device enables the repair and reconfiguration of the storage mediums without requiring user knowledge of the details of the process. The local control of the VLUN allows a user to have uninterrupted access to the user's data even during reconfiguration and repair of the storage mediums.

Figure 1:
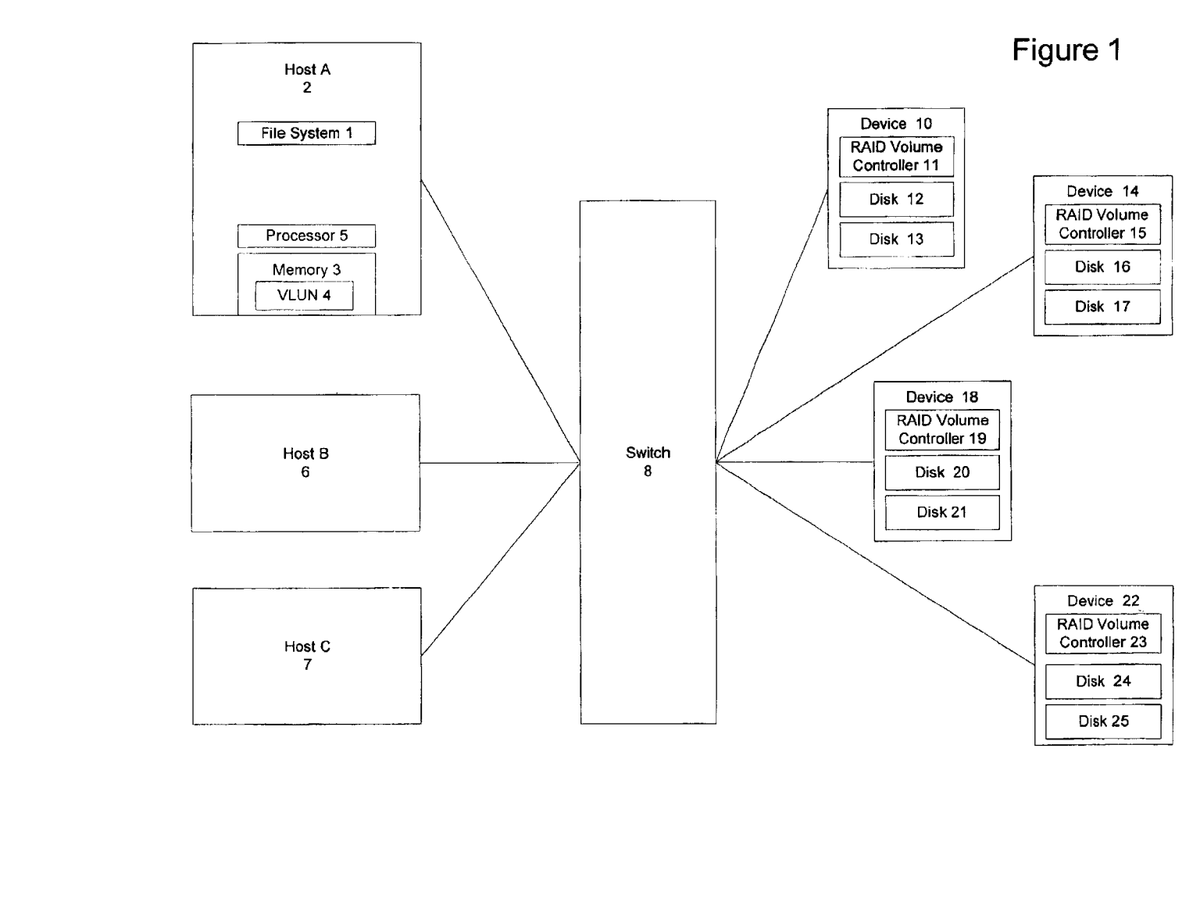
FIG. 1 is a block diagram of an environment suitable for practicing an illustrated embodiment of the present invention.

FIG. 1 depicts an environment suitable for practicing the illustrative embodiment of the present invention. A plurality of hosts, host A 2, host B 6, and host C 7 are interfaced with a network switch 8. Host A 2 includes a file system 1, memory 3, a VLUN 4 located in the memory, and a processor 5. Also interfaced with the network switch 8 are a plurality of storage devices 10, 14, 18, and 22. Each storage device 10, 14, 18, and 22 includes a volume controller 11, 15, 19, and 23, as well as a storage medium such as disk drives 12, 13, 16, 17, 20, 21, 24, and 25. The volume controller is used to write and read data from the storage mediums. Those storage mediums may be entire disk drives, or multiple volumes within a single disk drive. The file system 1 located on host A 2 sends data to the VLUN 4. The VLUN 4 redirects the data to an available storage device 10, 14, 18, and 22 selected by the VLUN. The illustrated embodiment of the present invention may use a RAID system for backing up data. For instance, the VLUN 4 may send a collection of data for storage via the network switch 8 to the RAID volume controller 15 located on storage device 14. The RAID volume controller 15 may then mirror the data on a mirror set made up of disk drives 16 and 17. "Mirroring" is a technique used to distribute multiple copies of the same data to two or more disks. Any time the data is updated, the data is changed for both copies. Similarly, the VLUN 4 may be used to read stored data. The VLUN 4 may receive a read request from the file system 1 and send the request to the RAID volume controller 15. The RAID volume controller 15 retrieves the data from the disk drives 16 and 17 and sends the data to the VLUN 4 which sends it to the file system 1. The VLUN 4 provides an interface between a host user and a storage medium so that the process of storing or reading the data on the medium is hidden from the user. The VLUN 4 may be moved between hosts 2, 6 and 7.

Figure 2:
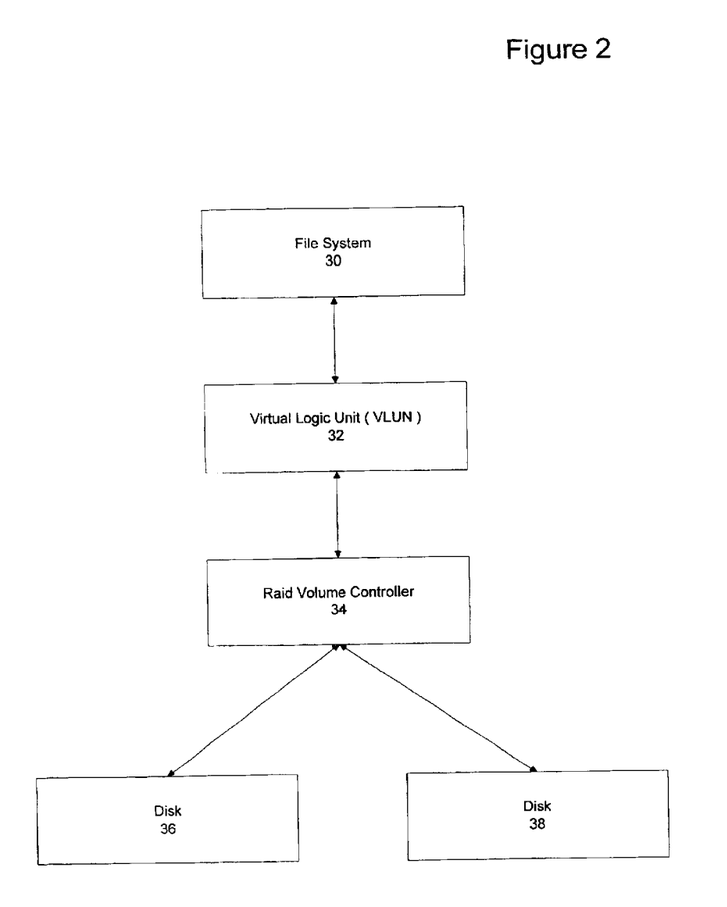
FIG. 2 is a block diagram of the hierarchical location of the virtual interface (VLUN)

FIG. 2 depicts a hierarchy utilized by the illustrative embodiment of the present invention. A file system 30 sends write and read requests to the VLUN 32. The file system 30 is a system that the operating system of the host 2 uses to organize files and directories. The VLUN 32 is a software created virtual interface between the file system 30 and the rest of the network storage system. The specific locations of the storage devices (the logical units), which may be locally or remotely located, are opaque to the file system which reads and writes data through the VLUN 32. The VLUN 32 is cabable of opaquely mapping data to many different types of storage devices in response to one request from the file system 30. The VLUN 32 sends its own write and read requests to a RAID volume controller 34 selected by the VLUN. The RAID volume controller 34 writes and reads data on available disks 36 and 38 in response to the requests received from the VLUN. Each entity in the hierarchical diagram is able to give commands only to the entity directly underneath in the heirarchical diagram. Thus the file system 30 may not write data directly to the RAID volume controller 34. Since the specific RAID volume controller location is immaterial to the file system 30 (which accesses the RAID volume controller 34 through the VLUN 32), the VLUN may substitute a different RAID volume controller (not shown) for the RAID volume controller 34 when storing data. Similarly, the disks 36 and 38 respond to a user's request for data by sending the data to the RAID volume controller 34 rather than directly to the VLUN 32 or file system 30. Those skilled in the art will recognize that there are many possible hierarchies within the scope of the present invention. For example, in systems without RAID volume controllers, the VLUN 32 may write and read data directly to the controllers for the disk drives 36 and 38. Similarly the requests to the VLUN 32 may originate with a database instead of a file system 30.

Figure 3:
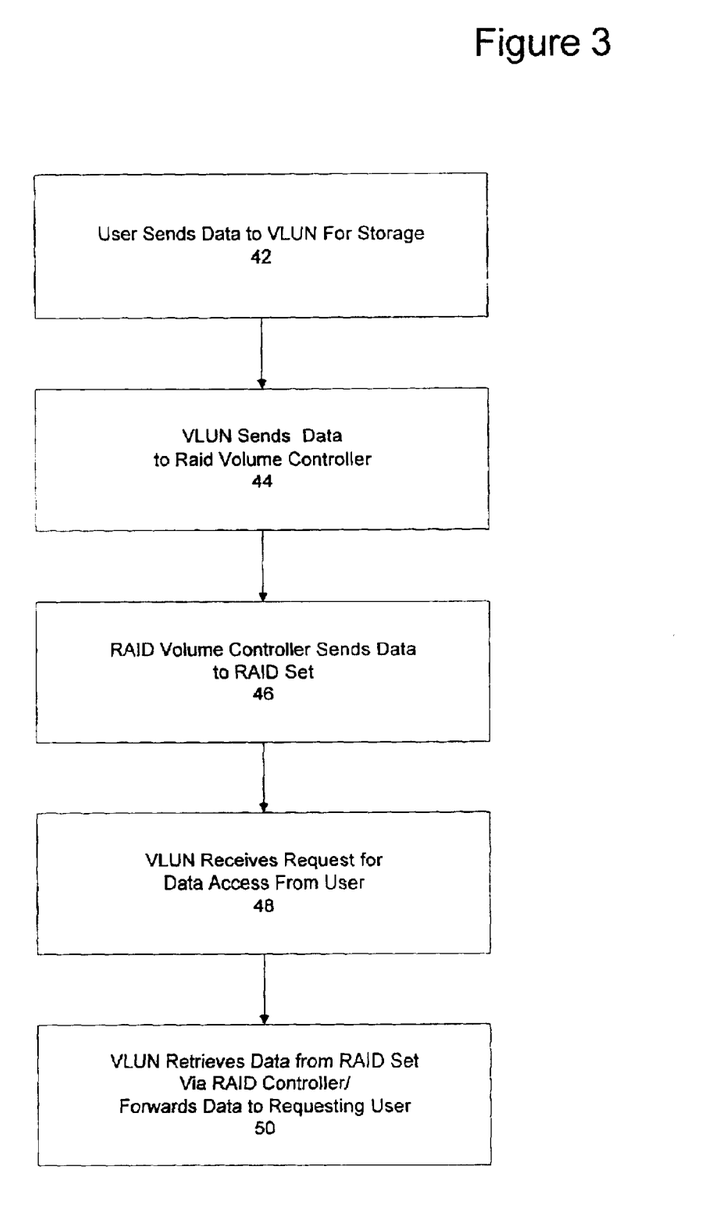
FIG. 3 is a flow chart depicting the sequence of steps followed by an illustrative embodiment of the present invention to store data using a RAID volume controller.

The VLUN 4 is responsible for determining an available storage location for data sent from a user, such as a file system 1 or database, of the host electronic device 2. FIG. 3 depicts the sequence of steps utilized by an illustrative embodiment of the present invention to store and then read data using a VLUN 4. A user on a host electronic device 2 sends data to the VLUN 4 for storage (step 42). The VLUN 4 determines available storage locations and then sends the data to a RAID volume controller (step 44) for an available RAID set. The RAID volume controller sends the data to a RAID set (step 46). Subsequently the VLUN 4 receives a request for data access from the user (step 48). The VLUN 4 retrieves the data from the RAID volume controller and forwards it to the requesting user (step 50). Those skilled in the art will recognize that alternate implementations of the present invention are possible. For example, the VLUN 4 may send the data to more than one RAID volume controller for storage, thus implementing different RAID levels for the same data.

Figure 4:
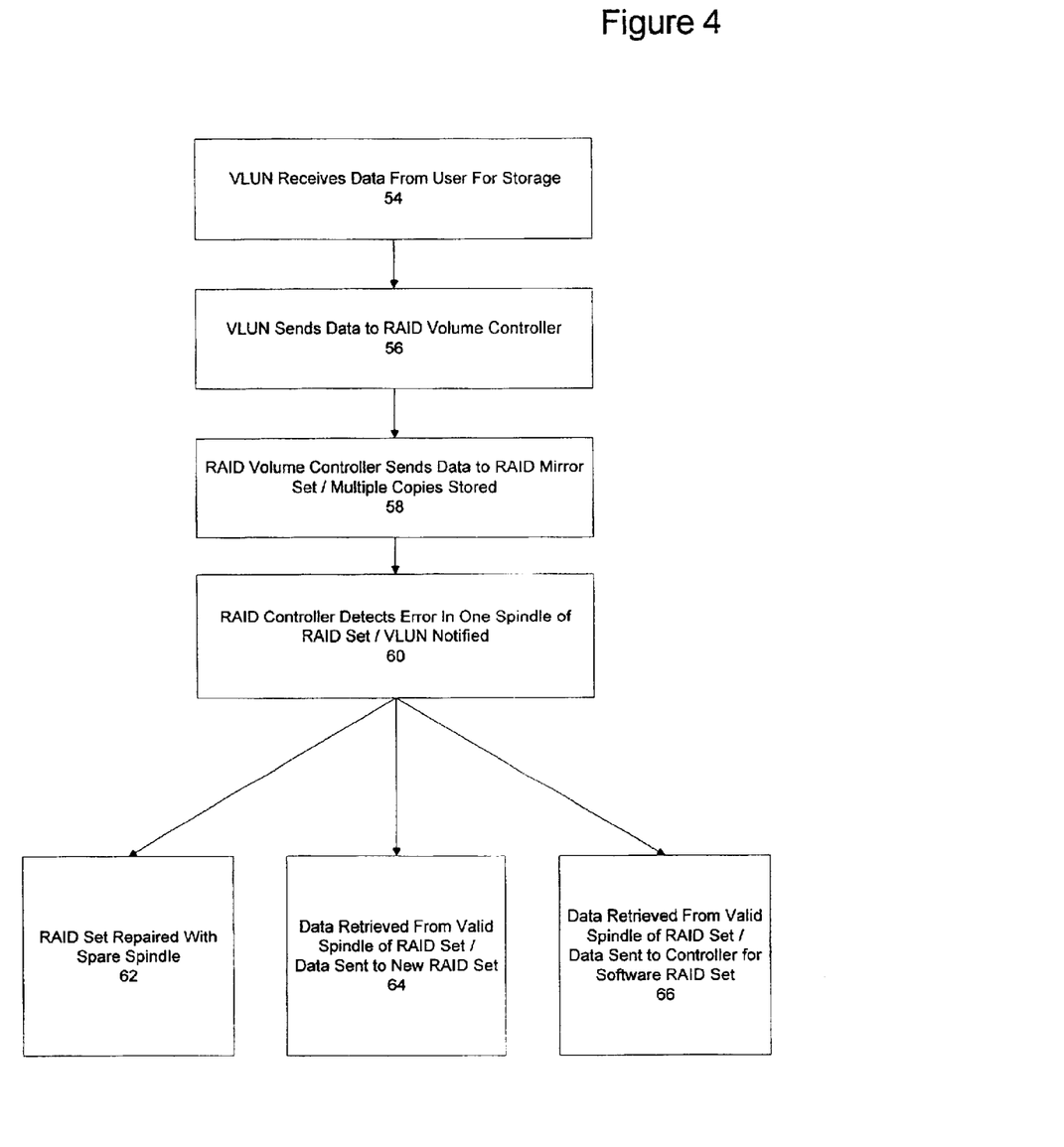
FIG. 4 is a flow chart of an alternate embodiment of the present invention indicating the steps followed upon the detection of an error in one side of a RAID set.

The VLUN 4 acts to ensure continued data access for a user in the event operations to reconfigure or repair the storage mediums are required or advisable. FIG. 4 depicts the sequence of events followed by an illustrative embodiment of the present invention upon the detection of an error in one side of a RAID set. A user on a host electronic device 2 sends data to the VLUN 4 for storage (step 54). The VLUN 4 sends the data to a selected RAID volume controller (step 56). The RAID volume controller sends the data to a RAID mirror set where multiple copies of the data are stored (step 58). Depending upon the RAID level of the RAID set, the copies may be two complete copies of the data, or may be a complete copy and a parity copy. The copies may or may not be striped across the storage mediums. In some embodiments, two disk drives may be used for the RAID mirror set. In other embodiments three or more whole disk drives may be used to create a RAID set. Alternatively, segments of disk drives with adjacent logical memory addresses may be utilized by a RAID volume controller to create a software RAID set. Those skilled in the art will recognize that there are a multitude of possible components, and many different configurations of components, that may be utilized without departing from the scope of the current invention.

As an illustrative example, subsequently to storing the data, the RAID controller may detect an error in one spindle of the RAID set. The VLUN 4 is notified of the error in the RAID set (step 60). Once the error in the spindle of the RAID set has been detected, the method of the present invention provides multiple ways to recover from the detected error. In one embodiment, the RAID set is repaired with a spare spindle (i.e., spare disk drive) (step 62). If the error is detected during an access request from the VLUN 4, a valid copy of the data is sent to the VLUN before or during the repairs to the spindle with the error. When the new spindle is in place, the data from the valid spindle of the RAID set is copied to the new spindle. In another embodiment of the present invention, data is retrieved from the valid spindle of the RAID set via the RAID volume controller and sent to the VLUN 4. The VLUN 4 verifies available storage locations and sends the data to a new RAID volume controller to be placed into a new RAID set (step 64). In another embodiment, data is retrieved by the VLUN 4 from the valid spindle of the RAID set using the RAID volume controller. Data is thereafter sent to a controller for a software RAID set which has been created using multiple storage mediums (step 66). Similarly, the VLUN 4 may schedule the movement of data from one RAID set to another so as to balance hardware use. Requests for data received during scheduled reconfiguration are treated as in the error detection process described above. Those skilled in the art will recognize that there are multiple error recovery and reconfiguration procedures possible within the scope of the present invention and those listed here are illustrative but not exhaustive.

Figure 5:
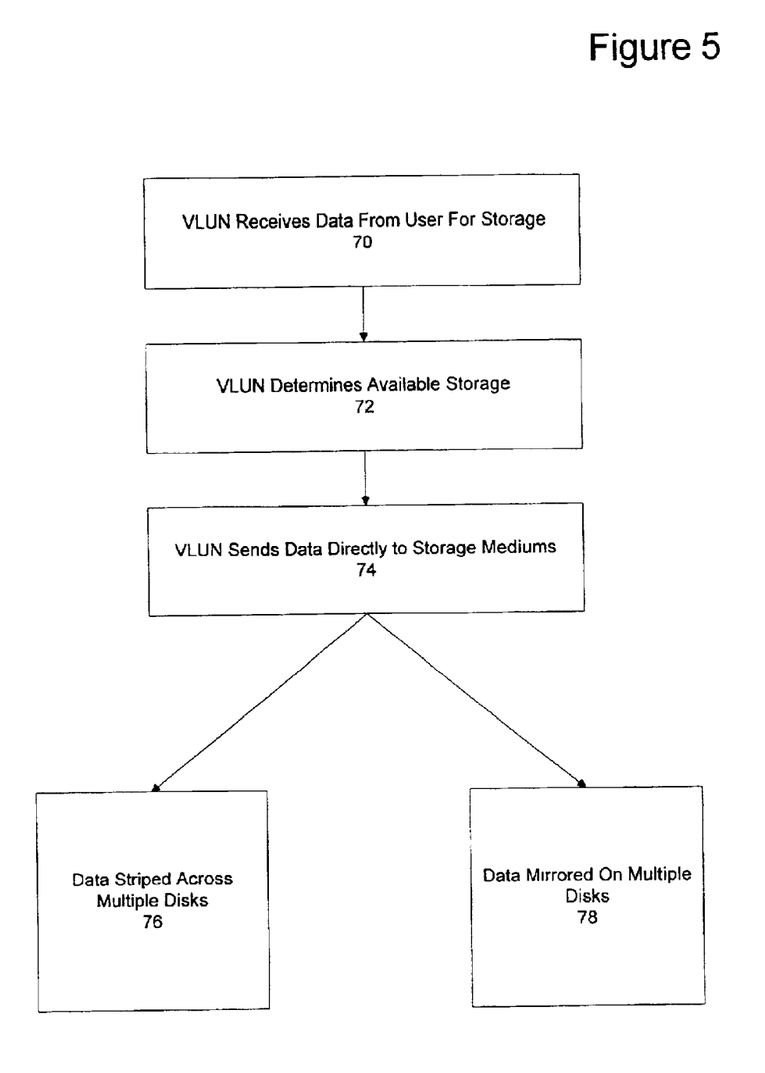
FIG. 5 is a flow chart depicting the sequence of steps followed by an embodiment of the present invention to store data with the the VLUN directly allocating the data to storage mediums.

In an alternative embodiment, the VLUN 4 sends data directly to available storage mediums. FIG. 5 depicts the sequence of steps followed to allocate data directly from the VLUN 4. The VLUN 4 receives data from a user for storage (step 70). The VLUN 4 checks the available storage mediums, such as disk drives, both local and remote (step 72) for available storage space. The VLUN 4 sends the data directly to the controllers for the storage mediums (step 74). There are a number of ways of storing the data within the scope of the current invention. The data may be striped across multiple disks (step 76) or the data may be mirrored among several disks (step 78). Those skilled in the art will recognize that the data may be striped and mirrored across multiple disks. Alternatively, complete duplicate copies of data or parity data may be stored. In this embodiment, the VLUN 4 allocates the data directly instead of sending it to an intermediate controller, such as a RAID volume controller.

Figure 6:
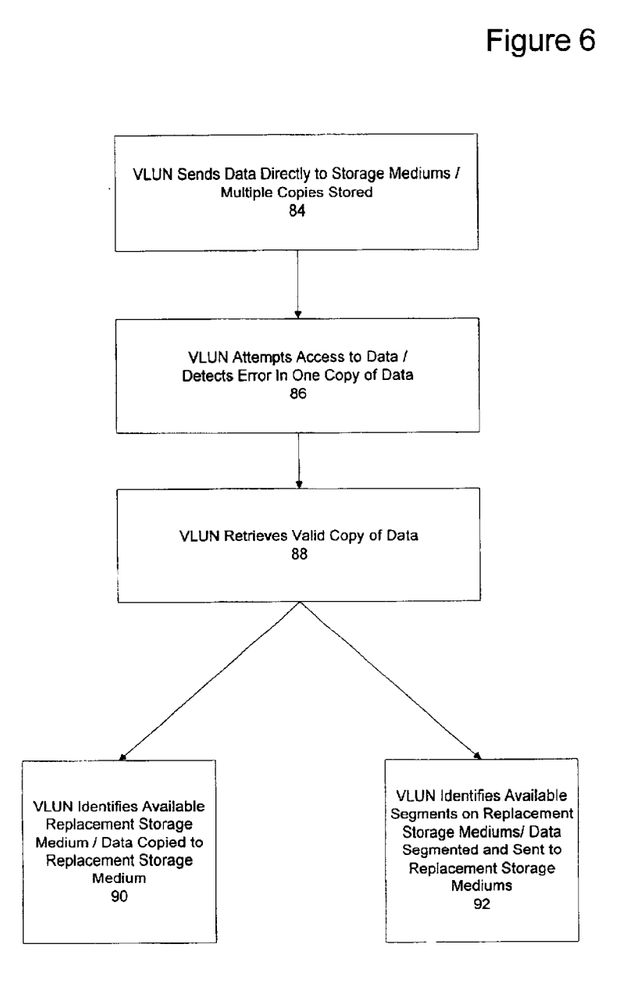
FIG. 6 is a flow chart of the sequence of steps followed by the embodiment of FIG. 5 in recovering from a detected error.

If the VLUN 4 is allocating data directly to the storage mediums without using a RAID volume controller, the VLUN is responsible for performing reconfiguration and repair operations on the storage mediums in a manner that minimizes data access disruptions to a user of the host electronic device 2. FIG. 6 depicts a sequence of steps followed by the VLUN 4 in an illustrative embodiment of the present invention upon detection of an error in a storage medium holding data directly allocated by the VLUN. The VLUN 4 allocates data directly to the storage medium in the manner discussed above (step 84). The VLUN then receives a user request to either read or write the data and attempts access to the stored data. Upon attempting access, the VLUN 4 detects an error in part of the stored data (step 86). The error may be mechanical error in the storage medium preventing the writing or reading of data, or the error may be a data error detected by the VLUN in comparing multiple copies of the data retrieved from the storage mediums which interferes with the reading of data. The VLUN 4 retrieves a valid copy of the data and sends it to the user (step 88). The VLUN 4 attempts the repair/reconfiguration of the detected error contemporaneously with retrieving the valid copy of the data or immediately thereafter. If the VLUN 4 is able to identify an additional available storage medium, the valid data may be copied to the identified storage medium (step 90). If the VLUN 4 is unable to identify a single available storage medium suitable for the valid data, the VLUN may segment the data and distributes the segments to multiple disks (step 92).

The illustrative embodiments of the present invention provide a virtual interface for the reading and writing of storage requests of a user of a host electronic device. By making the storage process transparent to the user, real-time reconfiguration and repair of storage mediums can take place without unduly disrupting user access to data. By providing the virtual interface on the host electronic device rather than locating the virtual interface out on the network, the user maintains greater access to data and more flexibility in recovering from hardware and software errors.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the types of storage structures noted in the drawings and description are examples and not the exclusive types of storage structures which may be employed within the scope of the present invention.

I claim:

1. In a network having a host electronic device and a plurality of storage devices with storage mediums, a method, comprising the steps of:

providing a plurality of controllers interfaced with said network that control access to said storage devices; and providing a virtual interface on said host electronic device between host electronic device and said plurality of storage devices, receiving with said virtual interface at least one of a data read requests and a write requests from a requestor, said requestor originating the request;

determining with said virtual interface a destination for said one of a data read requests and a write requests, said destination being one of said plurality of controllers; and sending from said virtual interface said one of a data read requests and a write requests to the determined destination controller.

2. The method of claim 1 comprising the further steps of:

sending data from said determined destination controller to a selected one of said storage mediums for storage on said storage devices.

3. The method of claim 2 wherein said requestor is a database.

4. The method of claim 2 wherein said requestor is a file system.

5. In a network having a host electronic device and a plurality of storage devices with storage mediums, said storage mediums accessed via at least one of a plurality of controllers interfaced with said network, a method, comprising the steps of:

providing a virtual interface on said host electronic device between said host electronic device and said plurality of storage devices, receiving with said virtual interface a write requests;

determining with said virtual interface a destination for said data write requests said destination being one of said plurality of controllers;

sending from said virtual interface said write requests to a determined RAID (Redundant Array of Independent/Inexpensive Disk) volume controller for a RAID set; and sending data from said RAID volume controller to said RAID set.

6. The method of claim 5 wherein said RAID set includes a first side and a second side and wherein parity data is sent to the first side of said RAID set and a full copy of said data is sent to the second side of said RAID set by said RAID volume controller.

7. The method of claim 5 wherein a complete copy of said data is sent to the first side and the second side of said RAID set.

8. The method of claim 5 wherein said data is striped among more than one disk of said RAID set.

9. The method of claim 5 wherein said RAID volume controller stores data on RAID sets with different RAID levels.

10. The method of claim 5 comprising the further step of:

providing a plurality of RAID sets; and moving said data from a first RAID set to a second RAID set based on a command from said virtual interface.

11. The method of claim 5 wherein said RAID set includes a first side and a second side, comprising the further steps of:

attempting to access the data stored on said RAID set for said user;

detecting an error in the first side of said RAID set; and providing said data from the second side of said RAID set to said user via said virtual interface and said RAID volume controller; and repairing said RAID set.

12. The method of claim 11 wherein said RAID volume controller copies said data to a different RAID set upon said error being detected.

13. An apparatus interfaced with a network, said network interfaced with a plurality of devices with storage mediums located thereon, said apparatus comprising;

a software facility for creating a virtual interface between said apparatus and said plurality of devices for receiving at least one of a read and a write requests for data from said apparatus, said virtual interface sending said at least one of a read and a write requests for said data to said devices with storage mediums located thereon; and a medium holding said software facility.

14. The apparatus of claim 13 further comprising:

a file system located on said apparatus, said file system sending said at least one of a read and write requests to said virtual interface.

15. The apparatus of claim 13 further comprising:

a database located on said apparatus, said database sending said at least one of a read and write request to said virtual interface.

16. The apparatus of claim 13 wherein said software facility automatically stores said data on more than one of said storage mediums.

17. The apparatus of claim 13 wherein said software facility automatically copies said data to a different storage medium upon detecting a failure in one of the storage mediums holding said data.

18. The apparatus of claim 13 wherein said software facility copies said data to a different storage medium in response to a request.

19. In an electronic device interfaced with a network, said network interfaced with a plurality of devices with storage mediums located thereon, a medium holding computer-executable instructions for a method, said method comprising the steps of:

providing a software facility located on said electronic device, said software facility creating a virtual interface between said electronic device and said plurality of storage mediums; and allocating data to said plurality of devices for storage using said virtual interface, said virtual interface receiving a request to store data from a requestor and determining said allocation without input from the requestor.

20. The medium of claim 19 wherein said method comprises the further steps of:

detecting a failure in one of said plurality of devices holding said data; and automatically allocating a copy of said data to a different one of said plurality of of devices for storage.

21. The medium of claim 19 wherein said method comprises the further step of:

allocating a copy of said data to a different one of said plurality of devices for storage in response to a request from said requestor.

22. In a network, a method, comprising the steps of:

wrapping a network storage medium inside a virtual logical unit, said virtual logical unit being a software created virtual interface encapsulating and hiding the location of said network storage medium;

placing said virtual logical unit between said network storage medium and an electronic device; and accessing data on said network storage medium through data read requests and data write requests sent from said electronic device to said virtual logical unit.

* * * * *